(12) United States Patent
Wu et al.

(10) Patent No.: US 7,949,052 B1
(45) Date of Patent: May 24, 2011

(54) METHOD AND APPARATUS TO DELIVER A DVB-ASI COMPRESSED VIDEO TRANSPORT STREAM

(75) Inventors: Fang Wu, San Jose, CA (US); Wen-hsiung Chen, Sunnyvale, CA (US); Gregory D. Pelton, Raleigh, NC (US); Joseph C. Gehman, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 2186 days.

(21) Appl. No.: 10/402,038

(22) Filed: Mar. 27, 2003

(51) Int. Cl.
*H04N 7/173* (2006.01)
*H04L 12/28* (2006.01)
*H04L 12/66* (2006.01)

(52) U.S. Cl. ............ 375/240.26; 341/95; 341/102; 370/342; 370/352; 370/394; 725/114; 725/152

(58) Field of Classification Search ............ 375/240
See application file for complete search history.

(56) References Cited

U.S. PATENT DOCUMENTS

| | | | | |
|---|---|---|---|---|
| 5,206,646 A * | 4/1993 | Sako et al. | ............ | 341/95 |
| 5,959,659 A * | 9/1999 | Dokic | ............ | 725/152 |
| 6,038,231 A * | 3/2000 | Dolby et al. | ............ | 370/394 |
| 6,144,658 A * | 11/2000 | Lebizay et al. | ............ | 370/352 |
| 6,154,772 A | 11/2000 | Dunn et al. | ............ | 709/217 |
| 6,208,666 B1 | 3/2001 | Lawrence et al. | ............ | 370/503 |
| 6,243,369 B1 * | 6/2001 | Grimwood et al. | ............ | 370/335 |
| 6,323,789 B1 * | 11/2001 | Lawrence | ............ | 341/102 |
| 6,434,562 B1 | 8/2002 | Pennywitt et al. | ............ | 707/10 |
| 6,456,782 B1 | 9/2002 | Kubota et al. | ............ | 386/98 |
| 6,473,007 B2 | 10/2002 | Lyons et al. | ............ | 341/60 |
| 6,721,957 B1 * | 4/2004 | Lawrence | ............ | 725/114 |

OTHER PUBLICATIONS

Net Insight, "Net Insight Media Network Solution", 2001 white paper.*
EN 50083-9, "Cabled Distribution Systems for Television, Sound and Interactive Multimedia Signals Part 9", CENELEC, 1997.*
"TT7115 ATM Streamer ", Tandberg Television ASA, Norway, 2002. Available at http://www.tandbergtv.com/prodsys/content/pdf/tt7115.pdf.
"VPG9000 STM-4/OC12c SDI/SDTI/DVB-ASI ATM Multiplexer", Video Products Group, Inc., Camarillo, CA, 2002. Available at www.vpginc.com.
"ASI/M2S & Serial ECL (DHEI)Interface: Real-time analysis, capture and playback over ASI/M2S & DHEI interfaces", Agilent Technologies MPEGscope Test Systems, Agilent Technologies, Palo Alto, CA, 2000. Available at www.Agilent.com/comms/MPEGscope.
"Transport Stream Packet Timestamping: A fundamental necessity for accurate stream reproduction in MPEG testing", Agilent Technologies MPEGscope Test Systems, Palo Alto, CA, 2000. Available at www.Agilent.com/comms/MPEGscope.
J.F. Snow, "Serial Digital Interface (SDI) Video Encoder", Xilinx, Inc., San Jose, CA, Nov. 2, 2001. Available at http://www.xilinx.com/xapp/xapp298.pdf.

* cited by examiner

*Primary Examiner* — Andy S Rao
*Assistant Examiner* — Hee-Yong Kim
(74) *Attorney, Agent, or Firm* — Dov Rosenfeld; Inventek (57) ABSTRACT

A method and apparatus to compress a DVB-ASI bit stream including accepting the stream containing packets of compressed media, sync words, and stuffing words, identifying starts of packets, identifying and discarding stuffing words; and adding information to form a compressed stream, added information sufficient to reconstruct a reconstructed stream from the compressed stream, with the relative locations of starts of packets in the reconstructed bit stream matching the relative locations of starts of corresponding packets in the accepted stream. Also a method recover the timing of MPEG packets including accepting a serial bit stream containing packets of compressed media streams, and ascertaining if the stream includes information indicating that the bit stream has a DVB-ASI form with stuffing words discarded and with indicating information added.

81 Claims, 6 Drawing Sheets

METHOD AND APPARATUS TO DELIVER A DVB-ASI COMPRESSED VIDEO TRANSPORT STREAM

BACKGROUND

The present invention related to digital video, and in particular, to a method and apparatus for transporting a serial bit stream conforming to DVB-ASI that includes packets of a compressed video stream.

Digital video is now well established and typically uses compressed video streams such as MPEG video streams that include video and audio information.

The European Digital Video Broadcasting (DVB) Standards Association has developed the DVB Asynchronous Serial Interface (DVB-ASI) standard to provide simple transport and interconnection of MPEG2 streams from different manufacturers' equipment. Equipment supporting this widely accepted standard today includes MPEG2 encoders, receivers, multiplexers, servers, and QAM modulators. While originally a European set of standards, DVB specifications and standards, including DVB-ASI, are in widespread use throughout the world, including the USA.

MPEG2 is an ISO/IEC standard for compressing, processing, decompressing, and representing digital video, audio, and combined video and audio.

While the DVB-ASI specification was originally written for interconnecting systems from various vendors, there recently has been a move to use DVB-ASI to store and to transport MPEG streams, e.g., for video on demand (VoD) and for digital video program suppliers. DVB-ASI can be used as the form for transport for example between head ends and video servers. A 270 Mbps DVB-ASI stream can be transported for example over ATM, over DTM, over SONET, over Gigabit Ethernet using IP, and so forth. A DVB-ASI stream may be transported from a video server, for example, to a QAM modulator for transport to a consumer.

A DVB-ASI digital stream is a 270 Mbps unidirectional stream designed for carrying a set of MPEG2 transport streams (TSs), either single program transport streams (SPTSs), multiple program transport streams (MPTSs), or both.

To transport one or more MPEG2 streams via DVB-ASI, a DVB-ASI transmitting interface converts each byte of data in each MPEG2 transport stream (TS) to a 10-bit word by 8B/10B coding. A serializer then converts the 10-bit words to a serial bit stream at a constant 270 Mbps. Each MPEG2 packet has 188 bytes. According to the DVB-ASI specification, to provide for byte/word alignment at the receiving end, each MPEG2 packet is preceded in the DVB-ASI stream by at least two 10-bit synchronization ("sync") words. The sync words are selected to be recognizable, e.g., so that they can be used for byte/word alignment at the receiving end. The K28.5 "comma characters"—00 1111 1010 or its complement 11 0000 0101 after 8B/10B coding—are used. Thus, at least 190 10-bit words are used to transport each 188-byte packet of MPEG data giving a maximum data throughput of 213 Mbps. Because single program streams are typically at far less than 270 Mbps, additional "stuffing" words are included in the stream to maintain the constant 270 Mbps rate.

A typical ASI stream generator (DVB-ASI transmitting interface) includes a 8B/10B encoder to encode the bytes of MPEG data followed by a serializer to convert the parallel words to a serial bit stream, to insert the sync words and to insert stuffing words as required to generate the 270 Mbps rate bit stream.

A DVB-ASI transmitting interface may be fed by a byte synchronized MPEG transport stream, typically a multiple program transport stream. Stuffing words may also be inserted in the DVB-ASI stream by the serializer in the interface whenever the next encoded 10-bits corresponding to the next MPEG byte to be converted to serial form is not available. The stuffing words typically are the same as the sync words, i.e., K28.5 words so that they are easily recognizable at the receiving side.

Figure 5A:
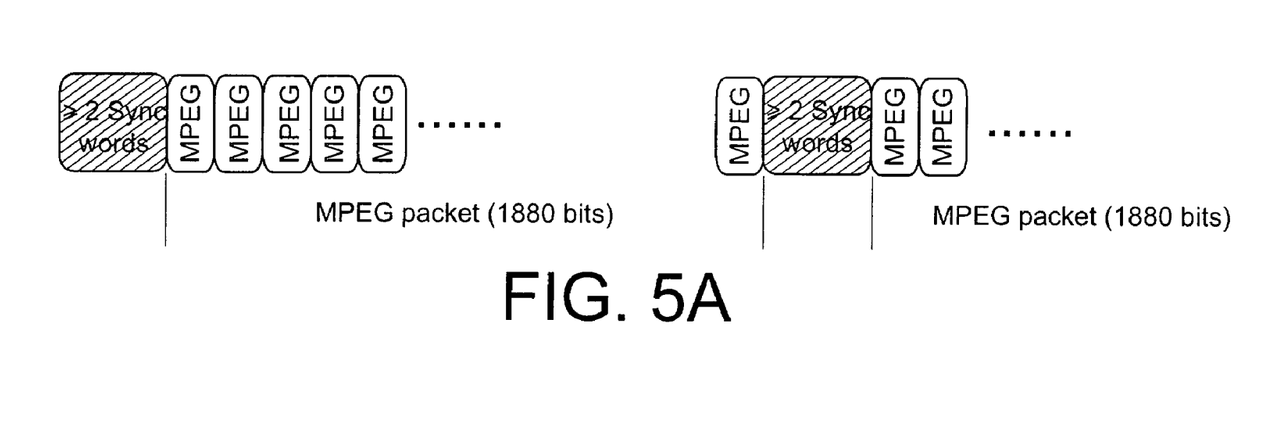
FIG. 5A shown how a DVB-ASI stream may contain each MPEG packet as a contiguous block of MPEG data words.
Figure 5B:
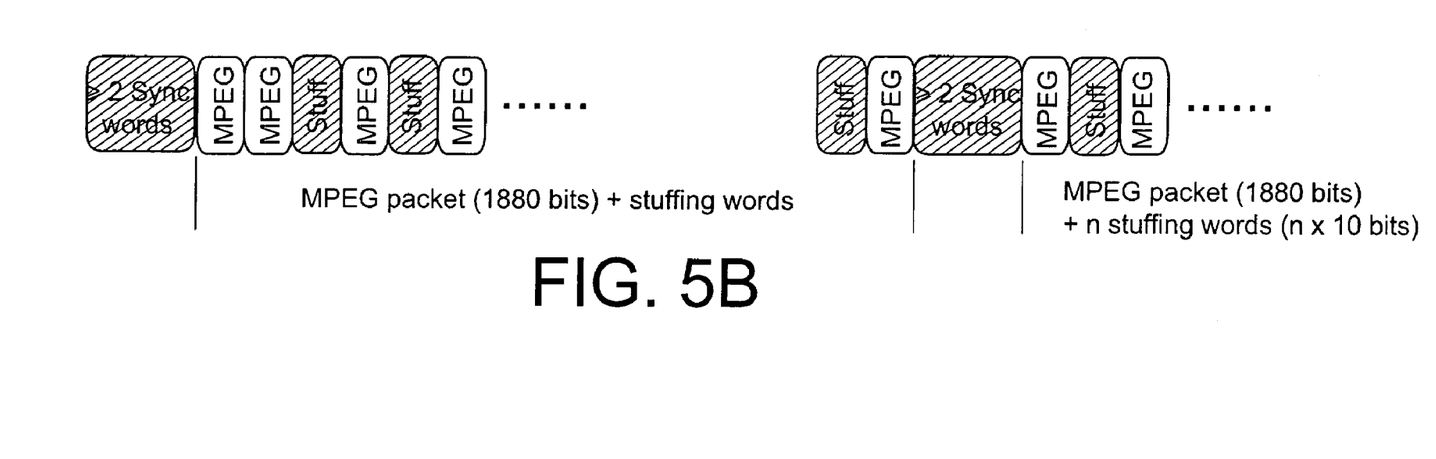
FIG. 5B shows how a DVB-ASI stream may contain each MPEG packet as interspersed MPEG data words with stuffing words between MPEG data words.

FIG. 5A shown how a DVB-ASI stream may contain each MPEG packet as a contiguous block of MPEG data words preceded by at least two K28.5 words. FIG. 5B shows how a DVB-ASI stream may contain each MPEG packet as interspersed MPEG data words with stuffing words (K28.5 words) between MPEG data words. Again, the first data word of an MPEG packet is preceded by at least two K28.5 words. A DVB-ASI stream may contain combination of contiguous blocks of MPEG data words and stuffing words between MPEG data words.

At the receiving end, after transport by some method, e.g., via a fiber link, or by direct connection, the one or more MPEG streams in a received DVB-ASI stream may be reconstructed from the received DVB-ASI stream by a DVB-ASI receiving interface. Converting the DVB-ASI stream includes clock and data recovery to reconstruct the individual bits. Recovered serial data bits are passed to a serial-to-parallel converter that converts the bits to 10-bit words (10B/10B encoded). A decoder then decodes 10-bit words into 8-bit data bytes. Typically, the serial-to-parallel converter also includes a pattern recognizer that can recognize sync words. Once two consecutive sync words are found, the start of the next word marks the boundary of subsequent received data words and establishes proper byte-alignment of decoder output bytes.

The end of a string of two or more sync words precedes the start an MPEG packet. Each MPEG packet includes a header that has an MPEG sync byte ($47_{hex}$). Typically, the serial-to-parallel converter' pattern recognizer can also recognize MPEG sync byte, even though this sync byte is encoded to a 10-bit MPEG sync word in the physical layer. A sequence of two DVB-ASI sync words followed by an MPEG sync word indicates the start of an MPEG packet.

A DVB-ASI receiving interface that converts a DVB-ASI stream to the embedded MPEG streams also removes the sync words and stuffing words in the DVB-ASI stream.

Consider as an example, the case that digital video in DVB-ASI form is taken from a Satellite by a content supplier. The bit rate of all programs including both video and audio is typically less than a quarter of the DVB-ASI capacity. However, because of the stringent buffer requirements set by the MPEG2 standard, the timing for each arriving MPEG2 transport packet in the DVB-ASI stream has to be maintained. As an example, the jitter for PCR on each of the MPEG transport packet must not exceed 500 ns according to MPEG2 standards. If the timing model of the transport layer is broken, a set-top box at an end user site may experience trouble to decode the content. This timing requirement normally prohibits people from removing the stuffing K28.5 words when the DVB-ASI bitstream are formatted for transport over packet based networks such as SONET, ATM, IP, and so forth.

Thus in the prior art, bandwidth is wasted when transporting DVB-ASI streams.

There thus is a need for a method and apparatus that enables bandwidth to be saved by removing some or all of the stuffing and/or sync words from a DVB-ASI prior to transport while providing for preserving timing information.

There also is a need for a method and apparatus that enables bandwidth to be saved by removing some or all of the stuffing and/or sync words from a DVB-ASI prior to transport while providing for reconstructing a DVB-ASI stream at the receiving end, the reconstructing a DVB-ASI stream having substantially correct timing.

SUMMARY

Disclosed herein is a method of and apparatus to compress a DVB-ASI bit stream to form a compressed bit stream. The method includes accepting a DVB-ASI bit stream containing a plurality of data words of the packets of one or more compressed media streams, a plurality of DVB-ASI sync words, and none or more stuffing words. The method further includes identifying the starts of packets in the accepted DVB-ASI stream, identifying and discarding stuffing words from the accepted DVB-ASI bit stream; and adding information to form a compressed serial bit stream.

The added the information is sufficient to reconstruct a reconstructed bit stream from the compressed serial bit stream, with the relative locations of the starts of packets of programs in the reconstructed bit stream matching the relative locations starts of the corresponding packets in the accepted DVB-ASI bit stream.

In one embodiment, the relative locations are of the starts of packets of consecutive packets in the bit stream. In another embodiment, the relative locations are of the starts of packets of consecutive packets that are of the same program.

Also disclosed is a method and apparatus to recover the timing of MPEG packets from a compressed bit stream. The method includes accepting a serial bit stream containing packets of one or more compressed media streams, and ascertaining if the bit stream includes information indicating that the bit stream has the form of a DVB-ASI stream from which stuffing words have been discarded and to which the indicating information was added. The method further includes in the case that indicating information is included, determining from the included indicating information the numbers of stuffing words that were discarded between starts of consecutive packets in the DVB-ASI stream. The included indicating information is sufficient to reconstruct from the serial bit stream a reconstructed DVB-ASI stream that includes the same number of stuffing words between consecutive starts of packets for all the programs in the stream.

In one embodiment, the starts of consecutive packets are of consecutive packets in the reconstructed DVB-ASI stream, and in another embodiment, the starts of consecutive packets are of consecutive packets of the same program in the reconstructed DVB-ASI stream.

DETAILED DESCRIPTION

Figure 1:
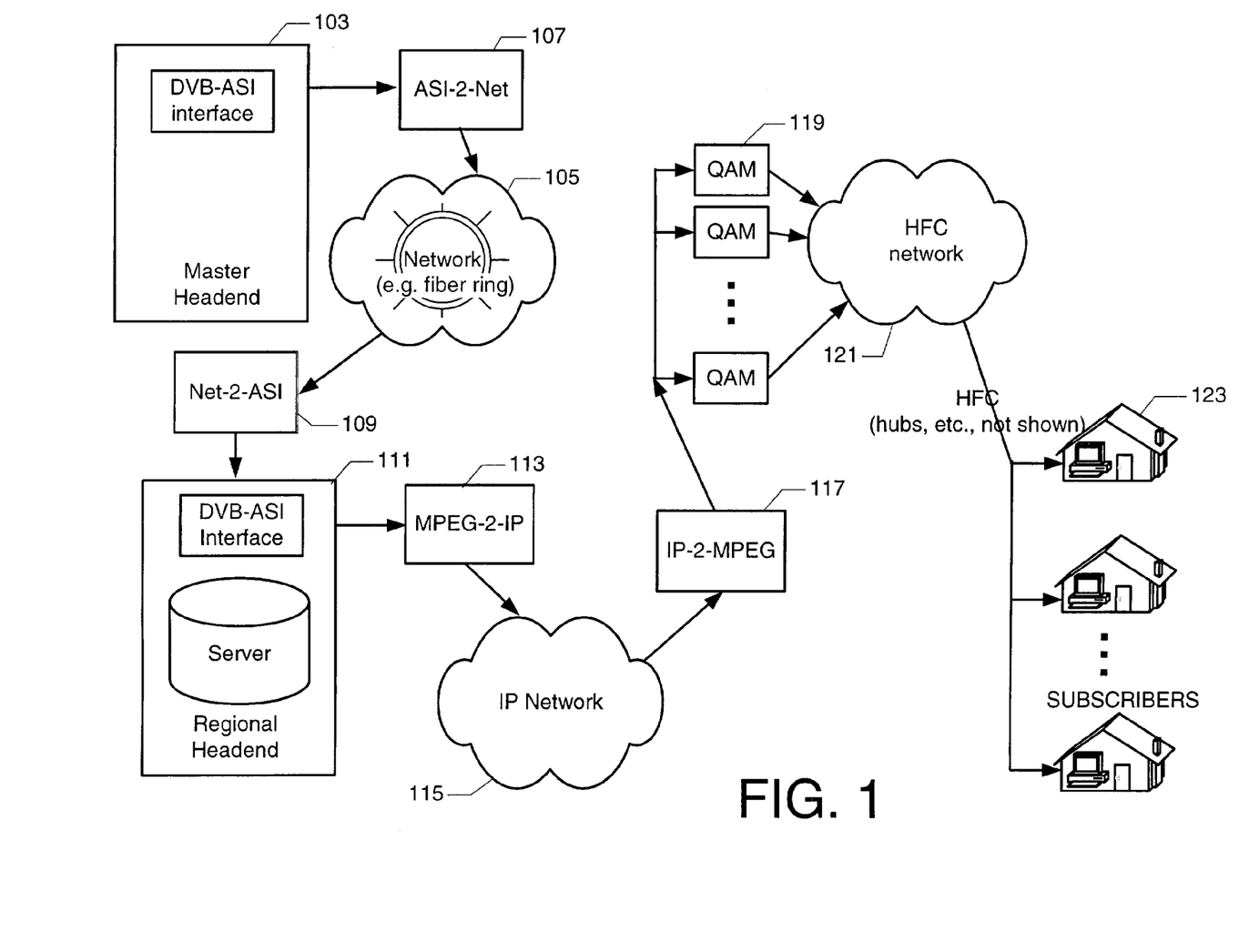
FIG. 1 shows in simplified form a typical video network configuration in which embodiments of the present invention may be used.

FIG. 1 shows a simple example of a digital video distribution configuration in which embodiments of the present invention may be used. While a configuration such as shown in FIG. 1 may be prior art, including an implementation of the method and/or apparatus described herein is not prior art. Note that FIG. 1 is in simplified form, and, for example, only shows the transport of streams in one direction, e.g., ultimately towards a subscriber. Control and other information that travels in the opposite direction is not shown in order not to obscure the inventive aspects.

FIG. 1 shows a master headend 103 that one or more sources (not shown) of MPEG video programs, such as programs taken off the air, locally generated programs, programs received via satellite, programs stored in a video server, and so forth. The master headend 103 includes a DVB-ASI interface that forms a DVB-ASI stream of an MEG2MPTS that includes several programs, not necessarily at the same rate. These programs are sent to one or more regional headends such as regional headend 111 via a network 105. Network 105 may be, for example, an optical fiber ring such as a SONET or SDH ring. It may also be an ATM network, or a Gigabit Ethernet network or other packet based network. In this example, it is assumed that network 105 is an ATM network on a SONET fiber ring.

A DVB-ASI-to-network gateway 107 encapsulates the DVD-ASI stream for transport over the network 105. One embodiment of DVB-ASI-to-network gateway 107 incorporates an aspect of the present invention that removes at least the stuffing words and in some versions, the sync words from the DVB-ASI stream for transport over the network 105. So removing the stuffing words and possibly the sync words forms a compressed stream.

A regional headend, e.g., regional headend 111 receives the DVB-ASI stream from network 105 via a network-to-DVB-ASI gateway 109. One embodiment of the network-to-DVB-ASI gateway 109 incorporates an aspect of the present invention that adds stuffing words and in some versions, sync words to the compressed stream transported over the network 105 to form a DVB-ASI stream.

In the example described herein, the regional headend 111 includes a DVB-ASI interface that converts the DVB-ASI stream received from the network-to-DVB-ASI gateway 109 to the MPEG2 multiple program stream. A demultiplexer separates the stream into the individual single program transport streams. Each MPEG SPTS may be locally stored, e.g., in a video server.

Individual MPEG streams may now be transported further, and for this purpose the regional headend may be considered an MPEG source. In one example, the MPEG source is coupled to an MPEG-to-IP gateway 117 that encapsulates the MPEG streams in IP packets, e.g., as IP/UDP/RTP packets. The MPEG-to-IP gateway 117 for example may be included in a network switch coupled to an IP packet based network 115, which may be a private network or internetwork, or may even be a public network or internetwork such as the Internet. In one typical application, network 115 is a fast network such as a gigabit Ethernet network.

The IP network 115 is used to transport streams, e.g., MPEG2 single program transport streams to an IP-to-MPEG gateway 117 that for example includes a network switch. IP-to-MPEG gateway 117 accepts the IP packets, extracts the encapsulated MPEG packets of each of the program streams and reconstructs the MPEG streams for further delivery. The MPEG streams may then be transported to their respective destinations. As one example, the IP-to-MPEG gateway 117 is coupled to set of QAM modulators 119 coupled to an HFC network 121 that transports the MPEG streams to end users (also called subscribers) 123. The HFC network is typically complex and includes many distribution points, e.g., to convert from optical to cable form. The end points of the HFC network are subscribers' set top boxes. A set top box includes a decoder that decodes the video stream for playback on an audiovisual terminal, e.g., a TV monitor.

Note that the above is by way of example. Other configurations and applications are possible. In another network, no regional headend may be involved, and the delivery to QAM modulators 119 may be in the form of a DVB-ASI stream via a network-to-DVB-ASI gateway and a DVB-ASI interface. In yet another example, the transport from the regional headend 111 is in the form of a DVB-ASI stream via a DVB-ASI interface and a DVB-ASI-to-network interface at the regional headend side, and a network-to-DVB-ASI gateway and a DVB-ASI interface at the receiving side, e.g., to the QAM modulators 119.

It is desired to save bandwidth in transporting a DVB-ASI stream by compressing the DVB-ASI stream, including removing stuffing words and in one embodiment, also removing the sync words from the DVB-ASI stream. It is also desired to recover the correct timing at the receiving end. It is also desired to reconstruct a reconstructed DVB-ASI stream at the receiving end.

Thus, one aspect of the invention is compressing a DVB-ASI bit stream by removing stuffing words, including adding information sufficient to reconstruct a DVB-ASI bit stream from the compressed stream. Another aspect of the invention is decompressing such a compressed bit stream to form a reconstructed DVB-ASI bit stream. Referring to FIG. 1, the compressing may be carried out in the DVB-ASI-to-network gateway 107, while the decompressing may be carried out in the network-to-DVB-ASI gateway 109

Figure 2:
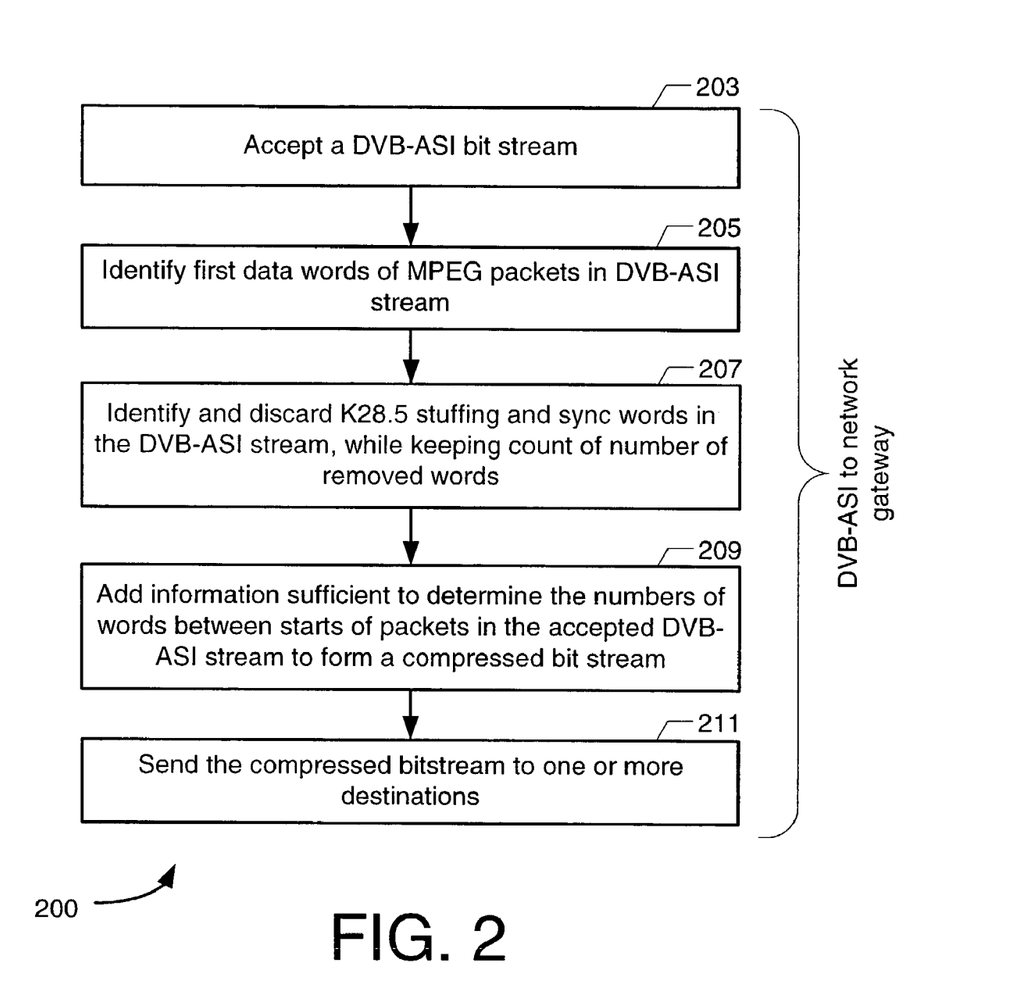
FIG. 2 shows a flow chart of a method embodiment of the invention. The method removes stuffing words from a DVB-ASI to form a compressed bit stream.

FIG. 2 shows a flowchart of one method embodiment 200 of the invention. Method 200 is to compress a DVB-ASI bit stream and includes in 203 accepting a DVB-ASI bit stream containing the bits of the 10-bit encoded data words of the MPEG packets of one or more MPEG streams. The DVB-ASI bit stream includes a plurality of sync words, and may include in addition some stuffing words.

FIG. 5A shows how a DVB-ASI stream may contain each MPEG packet as a contiguous block of MPEG data words preceded by at least two sync words—the K28.5 (comma) words in one embodiment. Some of the words between blocks of MPEG packet data words are stuffing words. The stuffing words are typically the same K28.5 (comma) word as the sync words. FIG. 5B shows how a DVB-ASI stream may contain each MPEG packet as interspersed MPEG data words with stuffing words between MPEG data words. Again, the stuffing words are typically the same K28.5 word as the sync words. Again, the first data word of an MPEG packet is preceded by at least two K28.5 words. In general, a DVB-ASI stream may contain combination of contiguous blocks of MPEG data words and stuffing words between MPEG data words.

Method 200 includes in step 205 identifying starts of MPEG packets in the accepted DVB-ASI stream. In one embodiment, the identifying includes identifying the 8B/10B encoded MPEG header (8B/10B encoded version of $47_{hex}$ byte). In another embodiment, identifying includes identifying a string of at least two consecutive sync words to establish the word boundaries then identifying the 8B/10B encoded MPEG header. The method further includes in step 207 identifying and discarding stuffing words from the accepted DVB-ASI bit stream. In one embodiment, a count is kept of the number of stuffing words being discarded. Keeping the count in one version counts the number of words being discarded, while in another, keeping the count counts the number of words of any kind that are in the accepted DVB-ASI stream, starting from the last identified start of MPEG packet.

In one version, all K28.5 words, whether for stuffing or sync, are discarded in step 209.

Recall that typically the accepted DVB-ASI stream is a multiple program transport (MPTS) stream that includes a plurality of programs. Each program in the stream has a program identifier (PrID) that in MPEG-2 is a number. All packets belonging to the same elementary stream have the same PrID. While one embodiment considers the stuffing words between consecutive packets of any program in the accepted DVB-ASI stream, another embodiment further looks at the individual programs that are carried in the accepted DVB-ASI stream, and keeps a separate count of the number of stuffing words being discarded for each program—e.g., each PrID—in the stream.

In step 209, information is added to the stream to provide for the receiving end to reconstruct the timing of the MPEG packets, e.g., to reconstruct a valid DVB-ASI stream. The discarding of the K28.5 words and adding of the information form a compressed bit stream for transport via a network, e.g., network 105 of FIG. 1. The information added is sufficient to reconstruct a reconstructed bit stream from the compressed serial bit stream. The relative locations of starts of MPEG packets of programs in the reconstructed bit stream match the relative locations of starts of the corresponding MPEG packets of programs in the accepted DVB-ASI bit stream. The added sufficient information thus preserves the timing of the accepted DVB-ASI bit stream in the compressed serial bit stream.

In one embodiment, the sufficient information added provides for each MPEG packet the number of words from the first word of the packet to the first word of the subsequent packet in the accepted DVB-ASI stream.

In an alternate embodiment, the sufficient information added provides for each MPEG packet the number of words from the first word of the packet to the first word of the next packet that has the same program identifier PrID in the MPEG-2 context—in the accepted DVB-ASI MPTS stream. This is useful for example if there is a likelihood that a PrID filter may be used to discard unwanted MPEG packets from a stream along the path. The alternate embodiment has the additional benefit over the embodiment that provides the number of words between consecutive packets that it can pass a PrID filter without losing the time information.

In one version, applicable to both cases—consecutive packet distance and consecutive same PrID packet distance—this added information is in the form of a trailer added to the end of each packet. Different embodiments provide this number of words in different forms. One embodiment includes this number of words in the trailer. Other embodiments provide information sufficient to determine this number of words, e.g., the number of K28.5 words that were removed, or the number of K28.5 words that were removed over and above the two mandatory sync words, and so forth.

In one embodiment applicable, the trailer is in the form of four words.

Note that in the compressed bit stream, each trailer is followed by the data words of an MPEG packet starting with the 8B/10B encoded version of the MPEG sync byte. So long as enough words (five or more for a 4-word trailer) are buffered at the receiving end, the receiving end can use the encoded MPEG sync byte to establish word boundaries in the bit stream and to locate the trailer can be located at the receiving end of a stream.

In one embodiment, the four word trailer represents a 32 bit number, e.g., a number between 0 and $2^{32}-1$. The inventors believe this is sufficient to cover all practical streams. As an example, a DVB-ASI bit stream that has this number of words between every two consecutive starts of MPEG packets means that only 188 of approximately $2^{32}$ words are data in the stream. Such a stream would be one that carried a single MPEG stream of around 9 bits per second.

In another embodiment, the four-word trailer includes three words representing 24 bits of data and further includes a one-word (10-bit represents a 8-bit byte) identifying bit-pattern to provide for easy start-of-trailer identification. This provides for relatively easily identifying the trailer. The inventors believe that even having 24 bits of data is sufficient to cover almost all practical streams. As an example, a bit stream that has $2^{24}$ words between every two consecutive starts of MPEG packets means that only 188 of $2^{24}$ words are data. Such a case for example, is a 270 Mbps DVB-ASI stream carrying a single MPEG stream of around 2.4 kbps (kilobits per second).

In another embodiment, the four-word trailer includes two words representing 16 bits of data and further includes a two-word description on how the stuffing bytes are organized in the original packet. This provides a way to recover exactly the same MPEG transport stream as the sending side. The inventors believe that even having 16 bits of data is sufficient to cover almost all practical streams. As an example, a bit stream that has $2^{16}$ words between every two consecutive starts of MPEG packets means that only 188 of $2^{16}$ words are data. Such a case for example, is a 270 Mbps DVB-ASI stream carrying a single MPEG stream of around 600 kbps (kilobits per second).

Note that an apparatus can be built (see later) that can ascertain whether it is receiving a compressed bit stream or a conventional DVB-ASI stream by looking for the existence of at least two sync words preceding each start of packet in a DVB-ASI stream, or even by looking for the existence of any K28.5 words. Including an identifying bit-pattern in the trailer provides for a relatively simple mechanism for determining if a bit stream is a compressed bit stream by determining if the stream includes the identifying bit-patterns that indicate the existence of trailers.

Once the compressed bit stream is formed, the compressed bit stream may be sent to one or more destinations. Thus, in one embodiment, method 200 includes step 211 of sending the compressed bit stream over a network to one or more destinations.

The invention does not depend on the type of network. One version of the step 211 uses ATM frames to send the stream on the network. ATM if course provides a mechanism for sending a time dependent stream, including a mechanism for specifying a quality of service. Another uses IP packets to send the stream on the network, for example using the RTP protocol to encapsulate the data as RTP packets using UDP over IP.

Embodiments of step 211 include the sending sends over an optical fiber link. The optical fiber link in one version is a SONET link, and in another is an SDH link. Other optical links also may be used.

Note that one optical link embodiment sends the data directly over the optical fiber link. In alternate versions, ATM frames are used to send the stream, and the optical link is used to carry the ATM frames. Similarly, the optical link can carry IP packets used to carry the compressed bit stream to its one or more respective destinations.

Figure 3:
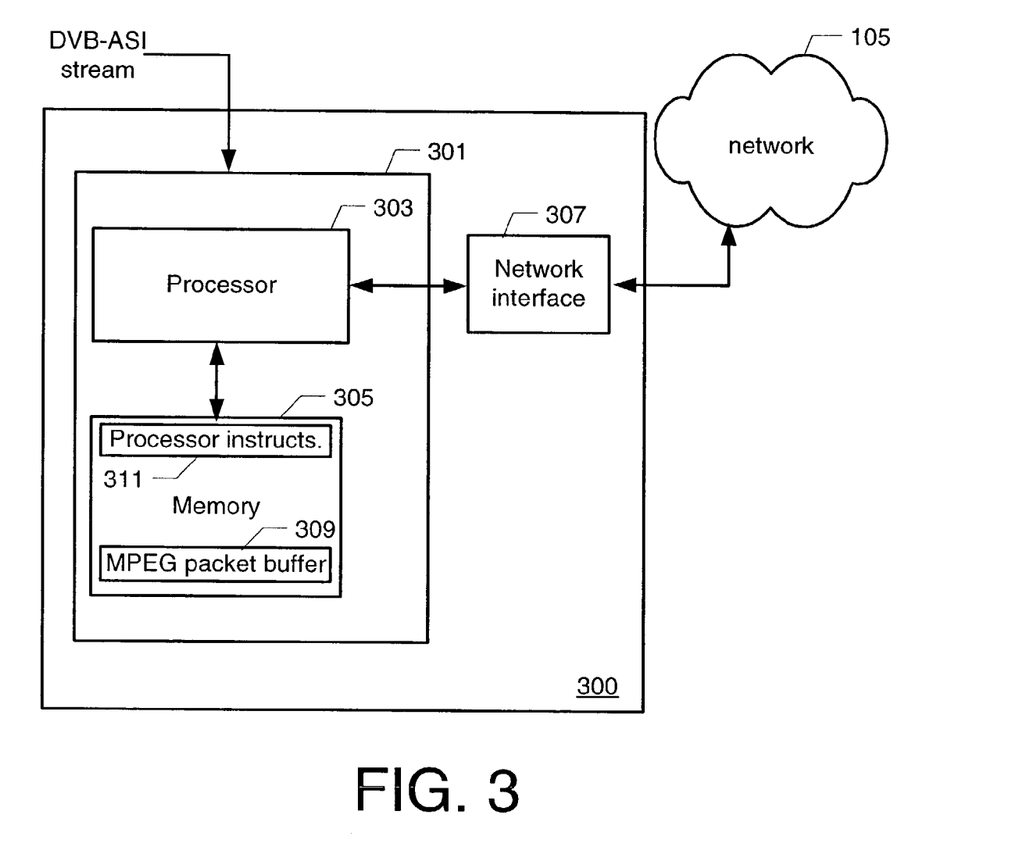
FIG. 3 shows an apparatus embodiment to compress a DVB-ASI stream to form compressed bit stream, e.g., for transport via a network.

FIG. 3 shows a simplified block diagram of one embodiment 300 of an apparatus to form a compressed bit stream from a DVB-ASI stream, including removing stuffing words from the DVB-ASI stream and including adding information that provides for restoring the correct timing of the data in the DVB-ASI stream. Referring to FIG. 1, the apparatus 300 typically is part of the DVB-ASI-to-network gateway 107. FIG. 3 leaves out a lot of the detail in order not to obscure the inventive aspects.

One embodiment includes a digital logic circuit 301 having an input port coupled to a source of a DVB-ASI bit stream and an output port to output the compressed stream. The digital logic circuit includes a buffer 309 to store bits of the DVB-ASI bit stream.

While some embodiments of the logic circuit may be hardwired, one embodiment includes a processor 303 coupled to the source of the DVB-ASI stream and to the buffer 309. In one embodiment, the buffer 309 is a separate hardware buffer, and in another, it is part of main memory 305 coupled to the processor 303. The memory 305 includes a set 311 of one or more computer readable code segments that instruct the processor to load the memory buffer 309 with a part of the DVB-ASI stream and carry out the steps of method 200 described above to form the compressed bit stream.

Thus, the digital logic is to load part of the DVB-ASI stream in the buffer 309, to identify starts of the MPEG packets in the DVB-ASI bit stream, and to identify and discard stuffing words from the DVB-ASI bit stream. The logic is further to add information to form the compressed serial bit stream, the added information sufficient to reconstruct a reconstructed bit stream from the compressed serial bit stream, such that the relative locations of the starts of the packets of programs in the reconstructed bit stream match the relative locations of the starts of the corresponding packets in the DVB-ASI bit stream. The logic is further to output the compressed serial bit stream to the output port. In one embodiment that includes processor 303, these actions are carried out by loading and executing in the processor instructions from the set 311 computer readable code segments in memory 305.

As described in the method embodiment above, the added sufficient information preserves the timing of the accepted DVB-ASI bit stream in the compressed serial bit stream. According to one embodiment apparatus, the sufficient information provides for each packet the number of words from the first word of the packet to the first word of the subsequent packet in the accepted DVB-ASI stream. In another embodiment, the sufficient information provides for each packet the number of words from the first word of the packet to the first word of the subsequent packet that has the same PrID in the accepted DVB-ASI stream.

One embodiment further includes an interface 307 coupled to the output port and to a network 105 capable of transporting the compressed serial bit stream via the network. In one embodiment, the interface forms ATM frames to send the compressed serial bit stream on the network 105.

Different embodiments of the apparatus 300 carry out corresponding different variations of the method 200 described above.

Another aspect of the invention is a method of determining the timing of MPEG packets of one or more programs from a compressed bit stream that was formed from a DVB-ASI stream from which the K28.5 words have been removed and to which information to preserve the timing has been added, or from a compressed bit stream formed directly from MPEG packets as if the compressed bit stream formed was formed from a DVB-ASI stream that was formed from the MPEG packets.

Figure 4:
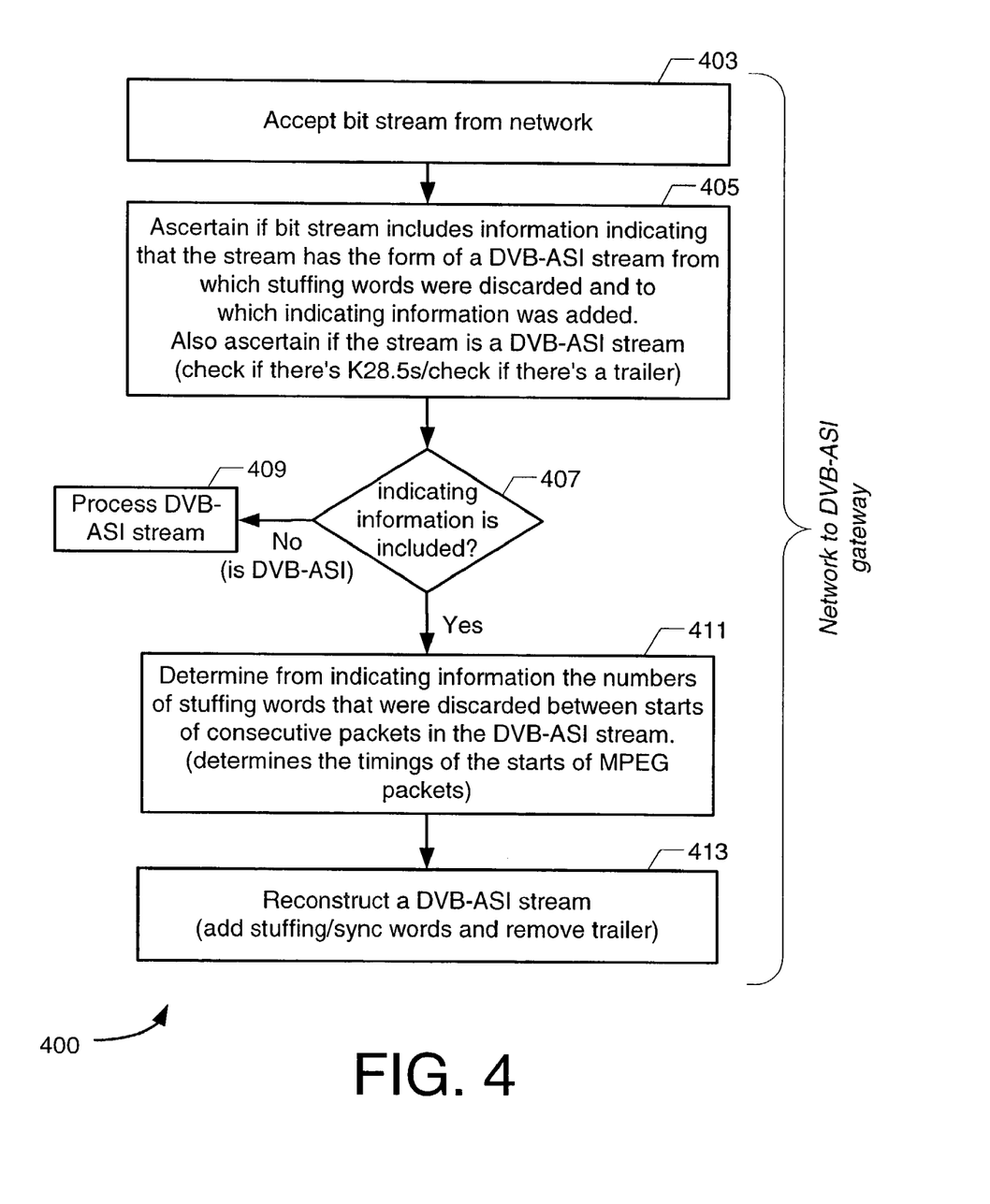
FIG. 4 shows a flow chart of a method embodiment of the invention that accepts a serial bit stream and, if it is a compressed bit stream, e.g., as formed by the method shown in FIG. 2, constructs an equivalent DVB-ASI stream, defined to be any bit stream that would have led to the compressed bit stream using the method shown in FIG. 2.

FIG. 4 shows one embodiment of a method 400 of so determining the MPEG packet timing by determining the numbers of stuffing words that were or that would have been discarded between starts of consecutive packets of programs in a DVB-ASI stream to produce the compressed bit stream. Referring to FIG. 1, method 400 typically is implemented in the network-to-DVB-ASI gateway 109.

The embodiment 400 includes in step 403 accepting a serial bit stream containing a plurality of data words of the packets of one or more compressed media streams. Step 405 includes ascertaining if the serial bit stream includes information indicating whether or not the bit stream is a compressed bit stream of a form of a DVB-ASI stream from which stuffing words have been discarded and to which the indicating information added.

In one embodiment, the ascertaining further includes ascertaining whether or not the bit stream is a DVB-ASI stream. Such DVB-ASI stream ascertaining includes searching for the existence of at least two sync words preceding each start of packet. In another embodiment, such ascertaining includes looking for the existence of any K28.5 words. If the bit stream is DVB-ASI, the method continues in step 409 to process the DVB-ASI stream as appropriate.

The included indicating information is sufficient to reconstruct from the serial bit stream a reconstructed DVB-ASI stream that includes the same number of stuffing words between consecutive starts of MPEG packets of programs as the DVB-ASI stream of the form of the compressed bit stream, i.e., a DVB-ASI stream from which the compressed bit stream would have been formed by removing stuffing words and adding the indicating information. There are many such DVB-ASI streams, and the term "an equivalent DVB-ASI stream" means any such DVB-ASI stream.

In the case that the method ascertains that indicating information is included (a branch of decision 407), the method includes in step 411 determining from the indicating information the numbers of stuffing words that were discarded between starts of consecutive packets of programs in an equivalent DVB-ASI stream. This provides the timing of the MPEG packets in the bit stream, i.e., the timings of the starts of packets of one or more programs in an equivalent DVB-ASI stream.

In one embodiment, the indicating information provides for each MPEG packet the number of words from the first word of the packet to the first word of the subsequent packet in an equivalent DVB-ASI stream. In another embodiment, the indicating information provides for each MPEG packet the number of words from the first word of the packet to the first word of the subsequent packet that has the same PrID in an equivalent DVB-ASI stream.

For the case that the indicating information provides number of words between start of packets of the same program (same PrID), one embodiment of the method includes determining the timing for one or more selected programs, i.e., one or more selected PIDs. In such a case, one embodiment of the method includes determining from the indicating information the numbers of stuffing words that were discarded between starts of consecutive packets of the one or more selected programs in an equivalent DVB-ASI stream.

Different embodiments provide this number of words in different forms. One embodiment includes this number of words in the trailer. Other embodiments provide indicating information sufficient to determine this number of words, e.g., the number of K28.5 words that would have been removed, or the number of K28.5 words over and above the two mandatory sync words that would have been removed from an equivalent DVB-ASI stream to form the compressed bit stream, and so forth. Another embodiment provides additional information to reconstruct the inter-packet stuffing words in the same pattern as were in the original DVB-ASI streams, even though this may be unnecessary for the timing recovery. In one embodiment, the stuffing word pattern information is encoded using variable length coding.

In one embodiment, the trailer is in the form of four words. In one version, the four words are used to provide a 32-bits number. In another, the four words are used to provide a 24-bit number and an identifying pattern (see below).

In one embodiment, the existence of the trailer is ascertained by detecting or not a start of MPEG packet (an 8B/10B encoded version of the MPEG sync byte) with no two or more sync words preceding the start-of-packet. The trailer immediately precedes a start of MPEG packet. Thus, so ascertaining the existence of the trailer includes buffering sufficient data, e.g., at least the trailer and the first MPEG word to establish word boundaries in the bit stream and to locate the trailer.

In another embodiment, the trailer includes M bits—e.g., 24 bits—of data and further includes an identifying bit-pattern—e.g., a one-word (10-bit) identifying bit-pattern to provide for easy start-of-trailer identification. For such an embodiment, the existence of the trailer includes detecting or not the identifying bit-pattern. In another embodiment, the trailer includes M bits—e.g., 16-bits—of data and further includes an indication of the stuffing byte pattern within the MPEG transport packet. This additional information can be used to recover the compressed packet to be as close as possible as the original transport packet in order to satisfy some equipment requirements, e.g., some non-DVB-ASI compliant equipment requirements that the manufacturer has specified. In one version, the two-bytes provides information on the number of the stuffing bytes inside the MPEG transport packet.

In one embodiment, the method further includes in the case that indicating information is included, step 413 of reconstructing a reconstructed DVB-ASI stream, including removing the indicating information (the trailer) and inserting stuffing words into the accepted stream. The reconstructed DVB-ASI stream is an equivalent DVB-ASI stream.

In step 413, the inserting stuffing words includes inserting at least two sync words immediately receding each start of MPEG packet to ensure that the reconstructed stream conforms to the DVB-ASI standard.

FIGS. 5A and 5B show two forms that such a reconstructed DVB-ASI stream may take. Because the DVB-ASI standard does not specify the number of stuffing words to insert between MPEG data words within a packet—the intra-packet gap—equivalent streams can contain variable lengths of stuffing words between packets. This intra-packet gapping effectively determines the "burstiness" of a DVB-ASI stream. A stream without any stuffing words creates a very bursty stream, whereas a stream with multiple stuffing words between MPEG data words can effectively spread out packets. This variation in the number of stuffing words may rarely cause compatibility or interoperability problems. DVB-ASI compliant equipment in theory handles any of these MPEG transport stream forms. In practice, not all equipment complies with all aspects of the DVB-ASI standard. Extremely bursty streams, e.g., no stuffing bytes within the packet, trailed by all the stuffing bytes, might cause failure for some none-compliant DVB-ASI equipment. Thus there is an incentive to create streams that include stuffing bytes within the packets.

In one embodiment, the inserting stuffing words only inserts stuffing words between the last data word of a packet and the first data word of the next packet. This forms a reconstructed equivalent DVB-ASI stream of the form shown in FIG. 5A.

In another embodiment, in the method, the inserting stuffing words includes inserting one or more stuffing words between data words of MPEG packets. This forms a reconstructed equivalent DVB-ASI stream of the form shown in FIG. 5B. By so distributed the stuffing bytes in the reconstruction process, even non-compliant DVB-ASI equipment that might have problems with extremely bursty streams should be able to handle the reconstructed stream. The embodiment of inserting intra-packet stuffing words includes buffering the serial bit stream from the start of an MPEG packet to the start of the next MPEG packet. If the indicating information indicates that there are N words between such a particular pair of consecutive starts of MPEG packets, N−188 stuffing words, including at least two sync words just before the second start-of-packet need to be inserted. Denote by $n_{stuff}$ the number of K28.5 words to be inserted between consecutive data words, including at least two just before the second start-of-packet. Then $$187 n_{stuff} + \max(n_{stuff}, 2) = N.$$

Thus when $n_{stuff} >= 2$, $n_{stuff} = \text{int}((N-188)/188)$ where int( ) is the nearest integer $$n_{stuff} = \text{int}\left(\frac{N}{188} - 1\right)$$

function. If using $n_{stuff}$ according to this formula produces more or less than N words total, the number of words between two of the MPEG data words is decreased or increased, as the case may be, to produce the required total of N.

As an example, consider a compressed bit stream containing the MPEG packets of a single 6 Mbps MPEG stream. If the same numbers of stuffing words are placed between all the pairs of consecutive packets, N, the number of words between consecutive starts of MPEG packets for such a stream is 6768. $n_{stuff}$ is 35 using the above formula.

Another aspect of the invention is an apparatus to determine the timing of MPEG packets from a compressed bit stream that was formed from a DVB-ASI stream from which the K28.5 words have been removed and to which information to preserve the timing has been added, or from a compressed bit stream formed directly from MPEG packets as if the compressed bit stream formed was formed from a DVB-ASI stream that was formed from the MPEG packets.

Figure 6:
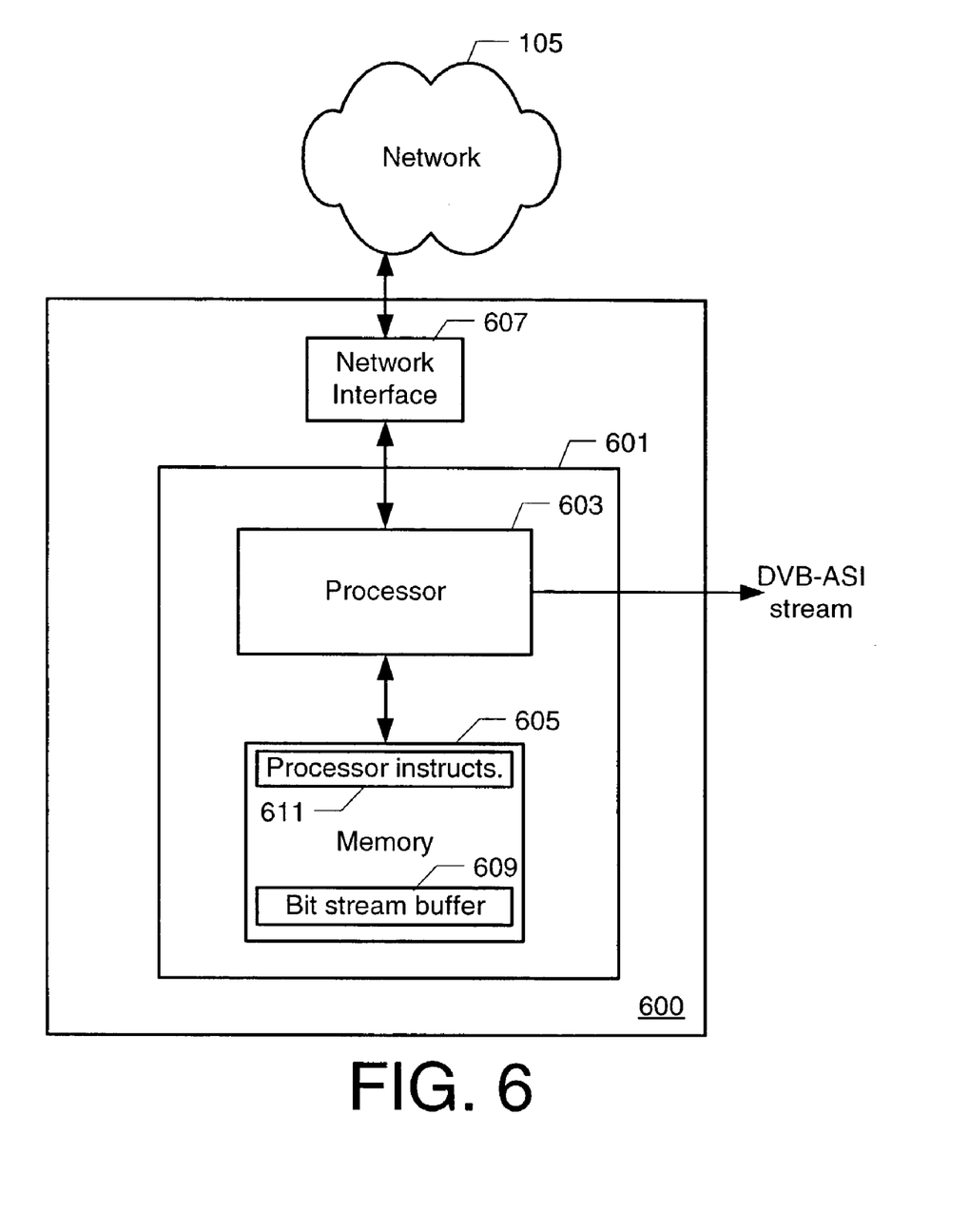
FIG. 6 shows an apparatus embodiment that accepts a serial bit stream and, if it is a compressed bit stream, e.g., as formed by the method shown in FIG. 2, constructs an equivalent DVB-ASI stream, defined to be any bit stream that would have led to the compressed bit stream using the method shown in FIG. 2.

FIG. 6 shows a simplified block diagram of one embodiment 600 of an apparatus to so determine the timing of the MPEG packets from a compressed bit stream. Referring to FIG. 1, the apparatus 600 typically is part of the network to DVB-ASI gateway 109. FIG. 6 leaves out a lot of the detail in order not to obscure the inventive aspects.

One embodiment includes a digital logic circuit 601 having an input port coupled to a source of a serial bit stream and an output port to output an equivalent DVB-ASI bit stream. The digital logic circuit includes a buffer 609 to store part of the bit stream.

While some embodiments of the logic circuit may be hard-wired, one embodiment includes a processor 603 coupled to the source of the bit stream and to the buffer 609. In one embodiment, the buffer 609 is a separate hardware buffer, and in another, it is part of main memory 605 coupled to the processor 603. The memory 605 includes a set 611 of one or more computer readable code segments that instruct the processor to load the buffer 609 with a part of the bit stream and carry out the steps of method 400 described above to determine the packet timing from the serial bit stream.

One embodiment further includes a network interface 607 coupled to the logic circuit and to a network shown as network 105. The interface 607 is capable of accepting a serial bit stream from the network. By accepting is meant accepting network data that is addressed to the apparatus. Included in this is the case where the network interface is a PHY interface to an optical network or to a cable connection that accepts a bit stream. In one version, the network is a packet network. Not described are the various layers, e.g., the PHY, the higher layers such as the MAC, IP etc. layers in the case of an IP network, and the equivalent layers in the case of an ATM packet network, and all the operations that are involved in accepting the serial bit stream in the buffer 609.

The logic circuit 601—in one embodiment in the form of computer instructions executing in the processor 603—is to ascertaining if the serial bit stream includes information indicating whether or not the bit stream is of the form of a compressed bit stream formed by discarding stuffing words from a DVB-ASI stream; and in the case that indicating information is included, to determine from the included indicating information the numbers of stuffing words that were discarded between consecutive starts of packets of packets in an equivalent DVB-ASI stream.

The included indicating information is sufficient to reconstruct from the serial bit stream a reconstructed DVB-ASI stream that includes the same number of stuffing words between consecutive starts of packets of programs. In one embodiment, the included indicating information is sufficient to reconstruct a reconstructed DVB-ASI stream that includes the same number of stuffing words between consecutive starts of packets, while in the another, the reconstructed DVB-ASI stream includes the same number of stuffing words between consecutive starts of packets that have the same PrID.

In one embodiment, the logic circuit's ascertaining also ascertains if the serial bit stream is a DVB-ASI stream.

Different embodiments carry out the ascertaining, including determining word boundaries in the input bit stream, by different mechanisms, as described above in the discussion of the method embodiment 400. The different ascertaining methods also are applicable depending on how the indicating information is included, e.g., is when included as a trailer, the trailer includes an identifying bit-pattern.

In one embodiment, the logic circuit 601 further forms an equivalent DVB-ASI stream and outputs the stream to its output port.

As described above in the method embodiment, different embodiments form different forms of equivalent DVB-ASI streams. One embodiment forms a stream having a form such as that shown in FIG. 5A, while another embodiment forms a form of an equivalent DVB-ASI stream with stuffing words evenly distributed between the data words of each MPEG packet. The bit stream buffer 609 in such an embodiment is capable of enough of the bit stream to so insert the stuffing bits, e.g., all the words of the incoming bit stream between two consecutive starts of MPEG packets.

Another aspect of the invention is a method that forms a compressed bit stream directly from a sequence of one or more streams of MPEG packets. The compressed bit stream is the same as if the method first formed a DVB-ASI stream carrying the MPEG streams and then formed the compressed bit stream from the DVB-ASI stream using one or more of the embodiments described above. See for example, embodiment 200 (FIG. 2).

The method includes accepting a sequence of MPEG packets, encoding each byte of each MPEG packet according to an 8B/10B code to produce a set of 10-bit words, serializing the 10-bit words to form a bit stream, and adding information to the bit stream to form a compressed serial bit stream. The information sufficient to construct a DVB-ASI bit stream carrying the sequence of MPEG packets from the compressed serial bit stream with the relative locations of the first data words of the packets in the reconstructed bit stream matching the relative locations of the corresponding first data words of MPEG packets in a DVB-ASI bit stream constructed directly from the accepted sequence of MPEG packets. The added sufficient information preserves the timing of the sequence of MPEG packets.

In an alternate embodiment, the added information further describes the pattern of the stuffing bytes in the original MPEG bitstream, so that the original bitstream can be exactly recovered. This may be useful, for example, for non-compliant DVB-ASI equipment. In one embodiment, the stuffing word pattern information is encoded using variable length coding.

Another aspect of the invention is a carrier medium carrying one or more computer readable code segments to instruct one or more processors of a processing system to implement a method such as method 200 (see FIG. 2 and the description above). One embodiment of the carrier medium for example, is indicated by reference numeral 305 in FIG. 3.

Another aspect of the invention is a carrier medium carrying one or more computer readable code segments to instruct one or more processors of a processing system to implement a method such as method 400 (see FIG. 4 and the description above). One embodiment of the carrier medium for example, is indicated by reference numeral 605 in FIG. 63.

Using the methods and apparatuses described above, a DVB-ASI stream may be transported via a network more efficiently, e.g., requiring less bandwidth than if the DVB-ASI was not first compressed. The MPEG packet's relative arrival timing is the same as if the DVB-ASI stream was sent uncompressed. For example, if a DVB-ASI stream was reconstructed from the compressed bit stream, the reconstructed DVB-ASI stream might be different from the original uncompressed DVB-ASI stream, but can still be decoded and transmitted by the DVS-DVB-ASI standard compliant device without any problems.

In an alternate embodiment, the sufficient information included in the stream from which stuffing words have been removed includes the exact numbers of K28.5 stuffing words removed between each of the MPEG data words. This can be used to include sufficient information to reconstruct exactly the same DVB-ASI stream as the original DVB-ASI stream, more information has to be stored at the end of the packet. For example, run-length coding technique can be used to count K28.5 stuffing words and the run-length count is stored at the end of the packet as additional information.

The DVB-ASI standard is described in European Standard EN 50083-9: "Cabled distribution systems for television, sound and interactive multimedia signals, Part 9: Interfaces for CATV/SMATV headends and similar professional equipment for DVB/MPEG-2 transport streams." European Standard EN 50083-9 is incorporated herein by reference. The DVB-ASI standard defines Layer-0 as the physical layer for connection either via coaxial cable or via optical fiber cable, and Layer-1, the data encoding layer that generates a 270 Mbps bit stream. Layer-2 is the MPEG data incorporated in the Layer-1 data. When DVB-ASI is used to transport one or more MPEG streams, it is converted to the Layer-1 bitstream. The resulting DVB-ASI stream is then transported, e.g., by a network, or by one of the physical connections described by Layer-0 of the EN 50083-9 standard.

One embodiment of each of the methods described herein is in the form of a computer program that executes on a processing system, e.g., a one or more processors that are part of an network to DVB-ASI gateway or part of an DVB-ASI to network gateway, as appropriate. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

While one embodiment described uses a trailer of four words to provide a 32-bit number, while another uses a trailer of four words to provide a 24-bit number and an identifying bit-pattern, yet another embodiment a trailer of two words that provide a 16-bit number. Such a compression scheme would work for a DVB-ASI stream that carried a single MPEG stream of a data rate of not less than about 775 kbps with the same number of stuffing bits added for each MPEG packet.

While the description is described in terms of MPEG2, the invention is not restricted to MPEG2 packets. For example, DVB-ASI is now being modified to work with the MPEG4 standard. DVB-ASI is also being modified to work with the ITU H.264 standard/proposed standard, sometimes referred to as 'part 10' of the MPEG4 standard.

It should further be appreciated that although the invention has been described in the context of an ATM, IP, SONET or SDH network, the invention is not limited to any type of network type or to any network architecture, and thus may be utilized in conjunction with one or a combination of other network architectures/protocols.

While embodiments described above include having information in the compressed bit stream in the form of a trailer that provides for each packet the number of words from the start of the packet to the start of the subsequent packet in an equivalent DVB-ASI stream, in alternate embodiments, the information is sufficient to provide for each packet the number of words from the start of the packet to the start of the previous packet. Other variations are possible as would be clear to those in the art.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

We claim:

1. A method comprising:
accepting a DVB-ASI bit stream containing a plurality of data words of the packets of one or more compressed media streams, a plurality of DVB-ASI sync words, and either no stuffing words, or one or more stuffing words;
identifying starts of packets in the accepted DVB-ASI stream;
identifying and discarding stuffing words from the accepted DVB-ASI bit stream, each stuffing word having a pre-defined bit pattern, the identifying and discarding including keeping track of the number of stuffing words being discarded by keeping track of the number of words being discarded or by keeping track of the number of words that are in the accepted DVB-ASI stream, starting from the last identified start of packet; and
adding indicating information to form a compressed bit stream, the indicating information sufficient to reconstruct a reconstructed bit stream from the compressed serial bit stream, reconstructing including inserting stuffing words into the compressed stream, the indicating information included in a trailer after the data words of each packet in the formed compressed bit stream, the trailer consisting of a number denoted M of bits, M being more than 8, the indicating information indicative of the numbers of stuffing words that were discarded between consecutive identified starts of packets, the trailer further including information on how the stuffing bytes are organized in the accepted DVB-ASI stream to provides a way to recover an MPEG transport bit stream identical to that in the accepted DVB-ASI bit stream,
the relative locations of the starts of packets of programs in the reconstructed bit stream matching the relative locations of the corresponding starts of corresponding packets in the accepted DVB-ASI bit stream,
wherein the accepted DVB-ASI stream can contain multiple programs,
wherein the keeping track of the number of words being discarded in the accepted DVB-ASI stream is for each program, and
wherein the indicating information provides for each program an indication of the number of words from the first data word of the packet of a program to the first word of the subsequent packet of the program in the accepted DVB-ASI stream,
such that the added indicating information preserves the timing of the accepted DVB-ASI bit stream in the compressed serial bit stream.

2. A method as recited in claim 1, wherein the identifying starts of packets identifies the first data word of each packet, and wherein the identifying and discarding stuffing words includes keeping track of the number of removed words.

3. A method as recited in claim 1, wherein the stuffing words and the DVB-ASI sync words use the same code word, and wherein identifying and discarding the stuffing words discards the DVB-ASI sync words.

4. A method as recited in claim 1, wherein the indicating information provides for each packet the number of words from the first data word of the packet to the first word of the subsequent packet in the accepted DVB-ASI stream.

5. A method as recited in claim 4, wherein the indicating information further provides an indication of the stuffing word pattern within the packet.

6. A method as recited in claim 4, wherein the trailer includes an identifying bit-pattern provided for identifying the start of the trailer.

7. A method as recited in claim 1, wherein M is 32.

8. A method as recited in claim 1, wherein the trailer includes an identifying bit-pattern provided for identifying the start of the trailer.

9. A method as recited in claim 1, wherein the indicating information further provides an indication of the stuffing word pattern within the packet.

10. A method as recited in claim 1, wherein the packets are MPEG packets of one or more MPEG streams.

11. A method as recited in claim 1, further comprising:
sending the compressed bit stream over a network to one or more destinations.

12. A method as recited in claim 11, wherein the sending uses ATM frames or IP packets to send the stream on the network.

13. A method as recited in claim 11, wherein the sending sends over an optical fiber link.

14. A method as recited in claim 13, wherein the optical fiber link is a SONET link or an SDH link.

15. A method comprising:
accepting a serial bit stream containing a plurality of data words of the packets of one or more compressed media streams,
ascertaining if the serial bit stream includes information indicating that the serial bit stream has the form of a DVB-ASI stream from which stuffing words have been discarded and to which the indicating information was added, each stuffing word having a pre-defined bit pattern, the indicating information included in a trailer after the data words of each packet in the accepted bit stream, the trailer consisting of a number denoted M of bits, M being more than 8, the indicating information indicative of the numbers of stuffing words that were discarded between consecutive starts of packets, the trailer further including information on how the stuffing bytes are organized in the accepted DVB-ASI stream to provides a way to recover an MPEG transport bit stream identical to that in the accepted DVB-ASI bit stream;

in the case that indicating information is included, determining from the included indicating information the numbers of stuffing words that were discarded between starts of consecutive packets of one or more programs in the DVB-ASI stream, wherein the included indicating information is sufficient to reconstruct from the serial bit stream a reconstructed DVB-ASI stream that includes an MPEG transport bit stream identical to that in the accepted DVB-ASI bit stream, wherein the DVB-ASI stream may include a plurality of programs, and wherein the indicating information provides for each program an indication of the numbers of stuffing words that were discarded between consecutive starts of packets of the program in the DVB-ASI stream.

16. A method as recited in claim 15, wherein the ascertaining also ascertains if the serial bit stream is a DVB-ASI stream.

17. A method as recited in claim 15, wherein the one or more compressed media streams are MPEG streams.

18. A method as recited in claim 15, wherein the indicating information further provides an indication of the stuffing word pattern within the packets.

19. A method as recited in claim 15, wherein the trailer includes an identifying bit-pattern provided for identifying the start of the trailer.

20. A method as recited in claim 15, wherein the determining of the stuffing word numbers from the included indicating information determines the numbers of stuffing words between the packets for one or more selected programs.

21. A method as recited in claim 15, wherein the trailer includes an identifying bit-pattern provided for identifying the start of the trailer.

22. A method as recited in claim 15, wherein the indicating information further provides an indication of the stuffing word pattern within the packets.

23. A method as recited in claim 15, wherein M is 32.

24. A method as recited in claim 15, further comprising:
reconstructing a reconstructed DVB-ASI stream, including removing the indicating information and inserting stuffing words into the accepted stream.

25. A method as recited in claim 24, wherein the inserting stuffing words includes inserting one or more stuffing words between data words of packets.

26. A method as recited in claim 25, wherein the indicating information provides the numbers of stuffing words that were discarded between consecutive starts of packets in the DVB-ASI stream and further provides an indication of the stuffing word patterns within the packets, and wherein the inserting stuffing words recreates the stuffing word patterns within the packets.

27. A method as recited in claim 25, wherein the inserting one or more stuffing words between data words of packets is such that the stuffing words are evenly distributed in the stream.

28. A method as recited in claim 24, wherein the inserting stuffing words only inserts stuffing words between the last data word of a packet and the first data word of the next packet.

29. A method as recited in claim 24, wherein the reconstructing includes inserting at least two sync words before the start the first data word of each packet to conform to the DVB-ASI standard.

30. An apparatus comprising:
digital logic having an input port and an output port, the input port coupled to a source of a DVB-ASI bit stream containing a plurality of data words of the packets of one or more compressed media streams, a plurality of DVB-ASI sync words, and either no stuffing words, or one or more stuffing words, each stuffing word having a pre-defined bit pattern, the logic including a buffer to store bits of a DVB-ASI stream; and the logic to
load the buffer with bits of a DVB-ASI bit stream,
identify the starts of packets in the DVB-ASI bit stream;
identify and discard stuffing words from the DVB-ASI bit stream, the identifying and discarding including keeping track of the number of stuffing words being discarded by keeping track of the number of words being discarded or by keeping track of the number of words that are in the accepted DVB-ASI stream, starting from the last identified start of packet;
add indicating information to form a compressed serial bit stream, the added indicating information sufficient to reconstruct a reconstructed bit stream from the compressed serial bit stream, reconstructing including inserting stuffing words into the compressed stream, the indicating information included in a trailer after the data words of each packet in the formed compressed bit stream, the trailer consisting of a number denoted M of bits, M being more than 8, the indicating information indicative of the numbers of stuffing words that were discarded between consecutive identified starts of packets, the trailer further including information on how the stuffing bytes are organized in the accepted DVB-ASI stream to provides a way to recover an MPEG transport bit stream identical to that in the accepted DVB-ASI bit stream; and
output the compressed serial bit stream to the output port, the relative locations of the of the starts of packets of programs in the reconstructed bit stream matching the relative locations of the corresponding starts of corresponding packets in the DVB-ASI bit stream,
such that the added indicating information preserves the timing of the accepted DVB-ASI bit stream in the compressed serial bit stream
wherein the accepted DVB-ASI stream can contain multiple programs,
wherein the keeping track of the number of words being discarded in the accepted DVB-ASI stream is for each program, and
wherein the indicating information is provides for each packet an indication of the number of words from the first word of the packet of a program to the first word of the subsequent packet of the program in the accepted DVB-ASI stream.

31. An apparatus as recited in claim 30, wherein the compressed media data streams are MPEG streams.

32. An apparatus as recited in claim 30, wherein the identifying starts of packets identifies the first data word of each packet, and wherein the identifying and discarding stuffing words includes keeping track of the number of removed words.

33. An apparatus as recited in claim 30, wherein the logic includes a processor and a memory coupled to the processor, and wherein the memory includes instructions to cause the processor to carry out the identifying the starts of packets; the identifying and discarding stuffing words, and the adding indicating information.

34. An apparatus as recited in claim 30, wherein the stuffing words and the DVB-ASI sync words use the same code word, and wherein identifying and discarding the stuffing words discards the DVB-ASI sync words.

35. An apparatus as recited in claim 30, wherein the indicating information in the trailer provides for each packet the number of words from the first word of the packet to the first word of the subsequent packet in the accepted DVB-ASI stream.

36. An apparatus as recited in claim 35, wherein the trailer includes an identifying bit-pattern.

37. An apparatus as recited in claim 30, wherein the packets are MPEG packets of one or more MPEG streams.

38. An apparatus as recited in claim 30, further comprising:
an interface, coupled to the output port and to a network capable of transporting the compressed serial bit stream via the network.

39. An apparatus as recited in claim 38, wherein the interface uses ATM frames to send the compressed serial bit stream on the network.

40. An apparatus as recited in claim 38, wherein the interface is uses IP packets to send the compressed serial bit stream on the network.

41. An apparatus as recited in claim 38, wherein the transporting sends over an optical fiber link.

42. An apparatus comprising:
a logic circuit coupled to a source of a serial bit stream containing a plurality of data words of the packets of one or more MPEG streams, the logic circuit including a buffer to store a segment of the serial bit stream,
the logic circuit to
ascertain if the serial bit stream includes information indicating that the serial bit stream has the form of a DVB-ASI stream from which stuffing words have been discarded and to which the indicating information was added, each stuffing word having a pre-defined bit pattern, the indicating information included in a trailer after the data words of each packet in the accepted bit stream, the trailer consisting of a number denoted M of bits, M being more than 8, the indicating information indicative of the numbers of stuffing words that were discarded between consecutive starts of packets, the trailer further including information on how the stuffing bytes are organized in the accepted DVB-ASI stream to provides a way to recover an MPEG transport bit stream identical to that in the accepted DVB-ASI bit stream; and
in the case that indicating information is included, determine from the included indicating information the numbers of stuffing words that were discarded between consecutive starts of packets of programs in the DVB-ASI stream,
wherein the included indicating information is sufficient to reconstruct from the serial bit stream a reconstructed DVB-ASI stream that includes an MPEG transport bit stream identical to that in the accepted DVB-ASI bit stream, and
wherein the DVB-ASI stream may include a plurality of programs, and
wherein the indicating information provides for each program an indication of the numbers of stuffing words that were discarded between consecutive starts of packets of the program in the DVB-ASI stream.

43. An apparatus as recited in claim 42, wherein the source of the serial bit stream includes a network interface coupled to the logic circuit and to a network, and capable of accepting a serial bit stream from the network.

44. An apparatus as recited in claim 42, wherein the logic circuit's ascertaining also ascertains if the serial bit stream is a DVB-ASI stream.

45. An apparatus as recited in claim 42, wherein the indicating information further provides an indication of the stuffing word pattern within the packets.

46. An apparatus as recited in claim 42, wherein the trailer includes an identifying bit-pattern.

47. An apparatus as recited in claim 42, wherein the logic circuit further is to:
reconstruct a reconstructed DVB-ASI stream, including removing the indicating information and inserting stuffing words into the stream.

48. An apparatus comprising:
means for accepting a DVB-ASI bit stream containing a plurality of data words of the MPEG packets of one or more MPEG streams, a plurality of DVB-ASI sync words, and either no stuffing words, or one or more stuffing words;
means for identifying the first data word of each packet in the accepted DVB-ASI stream;
means for identifying and discarding stuffing words from the accepted DVB-ASI bit stream to form a stuffing-word-free bit stream, each stuffing word having a pre-defined bit pattern, the means for identifying and discarding configured to include keeping track of the number of stuffing words being discarded by keeping track of the number of words being discarded or by keeping track of the number of words that are in the accepted DVB-ASI stream, starting from the last identified start of packet; and
means for adding indicating information to the stuffing-word-free bit stream to form a compressed serial bit stream, the indicating information sufficient to reconstruct a reconstructed bit stream from the compressed serial bit stream, reconstructing including inserting stuffing words into the compressed stream, the indicating information included in a trailer after the data words of each packet in the formed compressed bit stream, the trailer consisting of a number denoted M of bits, M being more than 8, the indicating information indicative of the numbers of stuffing words that were discarded between consecutive identified starts of packets, the trailer further including information on how the stuffing bytes are organized in the accepted DVB-ASI stream to provides a way to recover an MPEG transport bit stream identical to that in the accepted DVB-ASI bit stream,
the relative locations of the first data words of the packets of programs in the reconstructed bit stream matching the relative locations of the corresponding first data words of the packets of programs in the accepted DVB-ASI bit stream,
wherein the DVB-ASI stream may include a plurality of programs, and
wherein the indicating information provides for each program for each packet of the program an indication of the number of words from the first word of the packet to the first word of the subsequent packet of the program in the accepted DVB-ASI stream, such that the added indicating information preserves the timing of the accepted DVB-ASI bit stream in the compressed serial bit stream.

49. An apparatus as recited in claim 48, wherein the stuffing words and the DVB-ASI sync words use the same code word, and wherein identifying and discarding the stuffing words discards the DVB-ASI sync words.

50. An apparatus as recited in claim 48, wherein the trailer includes an identifying bit-pattern provided for identifying the start of the trailer.

51. An apparatus as recited in claim 48, further comprising:
means for sending the compressed bit stream over a network to one or more destinations.

52. An apparatus as recited in claim 51, wherein the means for sending uses ATM frames or IP packets to send the stream on the network.

53. An apparatus as recited in claim 51, wherein the means for sending sends over an optical fiber link.

54. An apparatus as recited in claim 53, wherein the optical fiber link is a SONET link or an SDH link.

55. An apparatus comprising:
means for accepting a serial bit stream containing a plurality of data words of the MPEG packets of one or more MPEG streams,
means for ascertaining if the serial bit stream includes information indicating that the serial bit stream has the form of a DVB-ASI stream from which stuffing words have been discarded and to which the indicating information was added, each stuffing word having a pre-defined bit pattern, the indicating information included in a trailer after the data words of each packet in the accepted bit stream, the trailer consisting of a number denoted M of bits, M being more than 8, the indicating information indicative of the number of stuffing words that were discarded between consecutive starts of packets, the trailer further including information on how the stuffing bytes are organized in the accepted DVB-ASI stream to provides a way to recover an MPEG transport bit stream identical to that in the accepted DVB-ASI bit stream;
means for determining from the included indicating information the numbers of stuffing words that were discarded between starts of consecutive packets of one or more programs in the DVB-ASI stream, the means for determining so determining in the case that indicating information is included,
wherein the included indicating information is sufficient to reconstruct from the serial bit stream a reconstructed DVB-ASI stream that includes, the trailer further including information on how the stuffing bytes are organized in the accepted DVB-ASI stream to provides a way to recover an MPEG transport bit stream identical to that in the accepted DVB-ASI bit stream,
wherein the DVB-ASI stream may include a plurality of programs, and
wherein the included indicating information provides for each program for each packet of the program the number of words from the first word of the packet to the first word of the subsequent packet of the program in the accepted DVB-ASI stream.

56. An apparatus as recited in claim 55, wherein the means for ascertaining also ascertains if the serial bit stream is a DVB-ASI stream.

57. An apparatus as recited in claim 56, wherein the DVB-ASI stream may include a plurality of programs, wherein the indicating information provides the numbers of stuffing words that were discarded between consecutive starts of packets in the DVB-ASI stream.

58. An apparatus as recited in claim 55, wherein the serial bit stream may contain a plurality of programs, and wherein the indicating information provides for each program the numbers of stuffing words that were discarded between consecutive starts of packets of the program in the DVB-ASI stream.

59. An apparatus as recited in claim 55, wherein the trailer includes an identifying bit-pattern provided for identifying the start of the trailer.

60. An apparatus as recited in claim 59, wherein M is 32.

61. An apparatus as recited in claim 55, further comprising:
means for reconstructing a reconstructed DVB-ASI stream, including removing the indicating information and inserting stuffing words into the accepted stream.

62. An apparatus as recited in claim 61, wherein the inserting stuffing words by the means for reconstructing includes inserting one or more stuffing words between data words of packets.

63. An apparatus as recited in claim 61, wherein the inserting stuffing words by the means for reconstructing only inserts stuffing words between the last data word of a packet and the first data word of the next packet.

64. An apparatus as recited in claim 61, wherein the means for reconstructing includes inserts at least two sync words before the start the first data word of each packet to conform to the DVB-ASI standard.

65. A method comprising:
accepting a sequence of MPEG packets;
encoding each byte of each MPEG packet according to a code to produce a set of words;
serializing the words to form a serial bit stream;
adding indicating information to the serial bit stream to form a compressed serial bit stream, the indicating information sufficient to construct a DVB-ASI bit stream carrying the sequence of MPEG packets from the compressed serial bit stream,
the relative locations of starts of MPEG packets of programs in the reconstructed bit stream matching the relative locations of starts of the corresponding MPEG packets in a DVB-ASI bit stream constructed directly from the accepted sequence of MPEG packets, the direct construction including either no stuffing words, or one or more stuffing words, each stuffing word having a pre-defined bit pattern,
wherein the adding the indicating information adds a trailer after the data words of each packet, the trailer consisting of a number denoted M of bits, M being more than 8, the indicating information indicative of the number of stuffing words that would have been added in the direct construction between consecutive identified starts of packets,
such that the added indicating information preserves the timing of the sequence of MPEG packets, and such that a DVB-ASI bit stream constructed from the compressed serial bit stream has the same synchronization as the DVB-ASI bit stream constructed directly from the accepted sequence of MPEG packets,
wherein the trailer includes information on how the stuffing bytes are organized in the DVB-ASI stream to provides a way to recover an MPEG transport bit stream identical to that in the DVB-ASI bit stream,
wherein the DVB-ASI stream may include a plurality of programs, and
wherein the indicating information provides for each program for each packet of the program the number of words from the first word of the packet to the first word of the subsequent packet of the program in the DVB-ASI stream.

66. A method as recited in claim 65, wherein the indicating information provides for each packet the number of words from the first word of the packet to the first word of the subsequent packet in the DVB-ASI bit stream constructed directly from the accepted sequence of MPEG packets.

67. A method as recited in claim 65, wherein the indicating information provides for each packet the number of words from the first word of the packet of a program to the first word of the subsequent packet of the same program in the DVB-ASI bit stream constructed directly from the accepted sequence of MPEG packets.

68. A method as recited in claim 65, wherein the trailer includes an identifying bit-pattern provided for identifying the start of the trailer.

69. A method as recited in claim 65, wherein M is 32.

70. A method as recited in claim 65, further comprising:
sending the compressed bit stream over a network to one or more destinations.

71. A computer readable storage medium encoded with one or more computer readable code segments that when executed by one or more processors of a processing system cause carrying out a method comprising:
accepting a DVB-ASI bit stream containing a plurality of data words of the MPEG packets of one or more MPEG streams, a plurality of DVB-ASI sync words, and either no stuffing words, or one or more stuffing words;
identifying the starts of packets in the accepted DVB-ASI stream;
identifying and discarding stuffing words from the accepted DVB-ASI bit stream to form a stuffing-word-free bit stream, each stuffing word having a pre-defined bit pattern, the identifying and discarding including keeping track of the number of stuffing words being discarded by keeping track of the number of words being discarded or by keeping track of the number of words that are in the accepted DVB-ASI stream, starting from the last identified start of packet; and
adding indicating information to the stuffing-word-free bit stream to form a compressed serial bit stream, the indicating information sufficient to reconstruct a reconstructed bit stream from the compressed serial bit stream, reconstructing including inserting stuffing words into the compressed stream, the indicating information included in a trailer after the data words of each packet in the formed compressed bit stream, the trailer consisting of a number denoted M of bits, M being more than 8, the indicating information indicative of the numbers of stuffing words that were discarded between consecutive identified starts of packets, the trailer further including information on how the stuffing bytes are organized in the accepted DVB-ASI stream to provides a way to recover an MPEG transport bit stream identical to that in the accepted DVB-ASI bit stream,
the relative locations of starts of the packets of programs in the reconstructed bit stream matching the relative locations of starts of the corresponding packets in the accepted DVB-ASI bit stream,
wherein the accepted DVB-ASI stream can contain multiple programs,
wherein the keeping track of the number of words being discarded in the accepted DVB-ASI stream is for each program, and
wherein the indicating information provides for each program an indication of the number of words from the first word of the packet of a program to the first word of the subsequent packet of the program in the accepted DVB-ASI stream, such that the added indicating information preserves the timing of the accepted DVB-ASI bit stream in the compressed serial bit stream.

72. A computer readable storage medium as recited in claim 71, wherein the stuffing words and the DVB-ASI sync words use the same code word, and wherein identifying and discarding the stuffing words discards the DVB-ASI sync words.

73. A computer readable storage medium as recited in claim 71, wherein the indicating information provides for each packet the number of words from the first word of the packet to the first word of the subsequent packet in the accepted DVB-ASI stream.

74. A computer readable storage medium as recited in claim 71, wherein the trailer includes an identifying bit-pattern provided for identifying the start of the trailer.

75. A computer readable storage medium as recited in claim 71, the method further comprising:
sending the compressed bit stream over a network to one or more destinations.

76. A non-transient computer readable storage medium encoded with one or more computer readable code segments that when executed by one or more processors of a processing system cause carrying out a method comprising:
accepting a serial bit stream containing a plurality of data words of the MPEG packets of one or more MPEG streams,
ascertaining if the serial bit stream includes information indicating that the serial bit stream has the form of an accepted DVB-ASI stream from which stuffing words have been discarded and to which the indicating information was added, each stuffing word having a pre-defined bit pattern, the indicating information included in a trailer after the data words of each packet in the accepted bit stream, the trailer consisting of a number denoted M of bits, M being more than 8, the indicating information indicative of the numbers of stuffing words that were discarded between consecutive starts of packets, the trailer further including information on how the stuffing bytes are organized in the accepted DVB-ASI stream to provides a way to recover an MPEG transport bit stream identical to that in the accepted DVB-ASI bit stream;
in the case that indicating information is included, determining from the included indicating information the numbers of stuffing words that were discarded between starts of consecutive packets of one or more programs in the DVB-ASI stream,
wherein the included indicating information is sufficient to reconstruct from the serial bit stream a reconstructed DVB-ASI stream that includes an MPEG transport bit stream identical to that in the accepted DVB-ASI bit stream,
wherein the DVB-ASI stream may include a plurality of programs, and wherein the included indicating information provides for each program for each packet of the program the number of words from the first word of the packet to the first word of the subsequent packet of the program in the accepted DVB-ASI stream.

77. A computer readable storage medium as recited in claim 76, wherein the ascertaining also ascertains if the serial bit stream is a DVB-ASI stream.

78. A computer readable storage medium as recited in claim 76, wherein the DVB-ASI stream may include a plurality of programs, and wherein the indicating information provides for each program the numbers of stuffing words that were discarded between consecutive starts of packets of the program in the DVB-ASI stream.

79. A computer readable storage medium as recited in claim 76, the method further comprising:
reconstructing a reconstructed DVB-ASI stream, including removing the indicating information and inserting stuffing words into the accepted stream.

80. A method comprising:
accepting a DVB-ASI bit stream containing a plurality of data words of the packets of one or more compressed media streams, a plurality of DVB-ASI sync words, and either no stuffing words, or one or more stuffing words;
identifying starts of packets in the accepted DVB-ASI stream;
identifying and discarding stuffing words from the accepted DVB-ASI bit stream, each stuffing word having a pre-defined bit pattern, the identifying and discarding including keeping track of the number of stuffing words being discarded by keeping track of the number of words being discarded or by keeping track of the number of words that are in the accepted DVB-ASI stream, starting from the last identified start of packet; and
adding indicating information to form a compressed bit stream, the indicating information sufficient to reconstruct a reconstructed bit stream from the compressed serial bit stream that has the same numbers of stuffing words between each of the MPEG data words, reconstructing including inserting stuffing words into the compressed stream, the indicating information included in a trailer after the data words of each packet in the formed compressed bit stream, the trailer consisting of a number denoted M of bits, M being more than 8, the indicating information indicative of the numbers of stuffing words that were discarded between consecutive identified starts of packets, the trailer further including information on how the stuffing bytes are organized in the accepted DVB-ASI stream to provides a way to recover an MPEG transport bit stream identical to that in the accepted DVB-ASI bit stream,
wherein the accepted DVB-ASI stream may include a plurality of programs, and
wherein the indicating information provides for each program for each packet of the program an indication of the number of words from the first word of the packet to the first word of the subsequent packet of the program in the accepted DVB-ASI stream,
such that the added sufficient information preserves the timing of the accepted DVB-ASI bit stream in the compressed serial bit stream.

81. A method comprising:
accepting a serial bit stream containing a plurality of data words of the packets of one or more compressed media streams,
ascertaining if the serial bit stream includes information indicating that the serial bit stream has the form of an accepted DVB-ASI stream from which stuffing words have been discarded and to which the indicating information was added, each stuffing word having a pre-defined bit pattern, the indicating information included in a trailer after the data words of each packet in the accepted bit stream, the trailer consisting of a number denoted M of bits, M being more than 8, the indicating information indicative of the numbers of stuffing words that were discarded between consecutive starts of packets, the trailer further including information on how the stuffing bytes are organized in the accepted DVB-ASI stream to provides a way to recover an MPEG transport bit stream identical to that in the accepted DVB-ASI bit stream;
in the case that indicating information is included, determining from the included indicating information the numbers of stuffing words that were discarded between consecutive data words of the MPEG packet of one or more programs in the DVB-ASI stream,
wherein the included indicating information is sufficient to reconstruct from the serial bit stream a reconstructed DVB-ASI stream that includes an MPEG transport bit stream identical to that in the accepted DVB-ASI bit stream,
wherein the accepted DVB-ASI stream may include a plurality of programs, and
wherein the indicating information provides for each program for each packet of the program an indication of the number of words from the first word of the packet to the first word of the subsequent packet of the program in the accepted DVB-ASI stream.

* * * * *